Dec. 3, 1935.  J. J. FENBY  2,022,761
DRYING METHOD AND APPARATUS
Filed Jan. 31, 1931   2 Sheets-Sheet 2
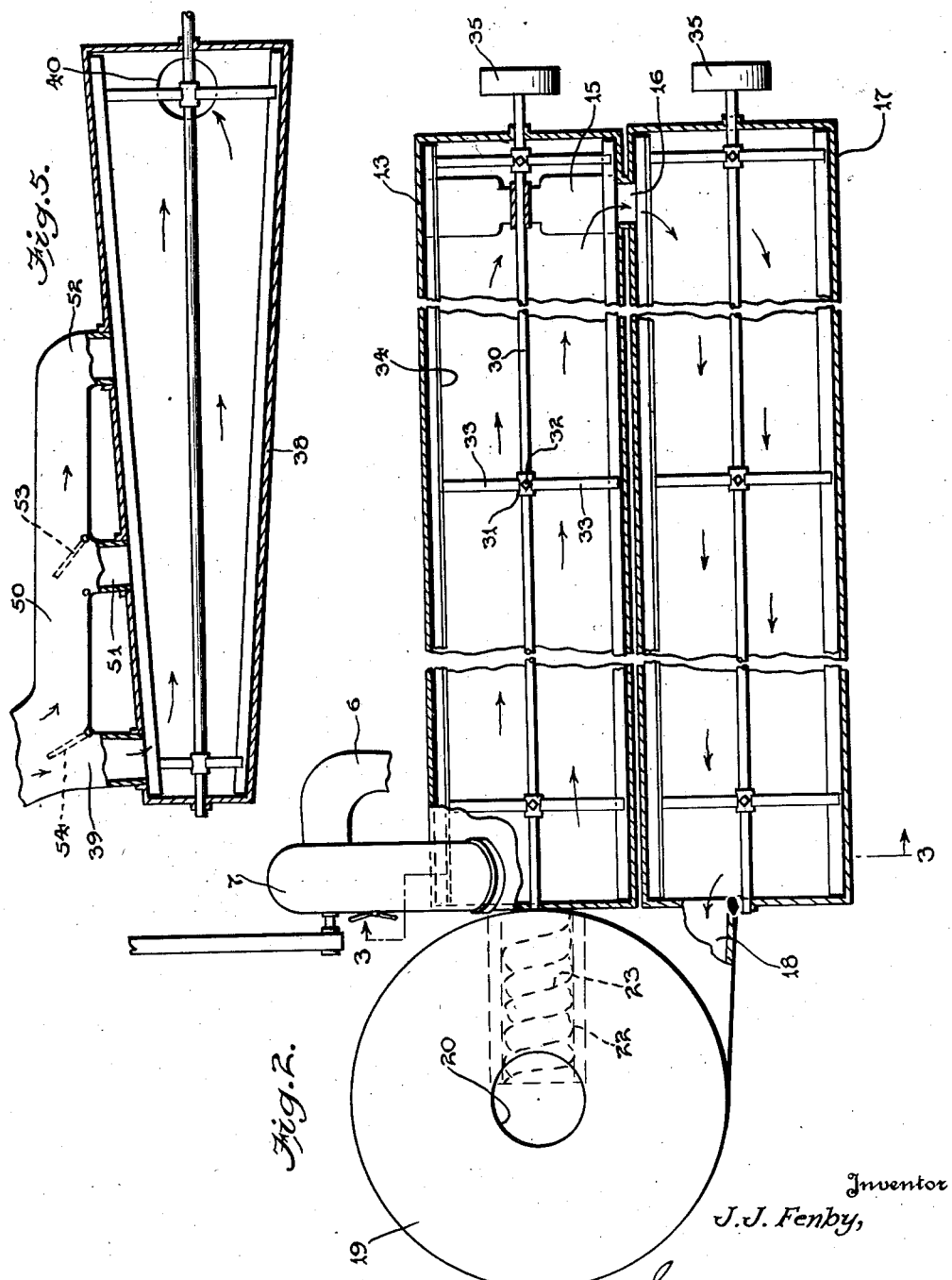
Inventor
J. J. Fenby,
By Seymour & Bright
Attorneys Patented Dec. 3, 1935

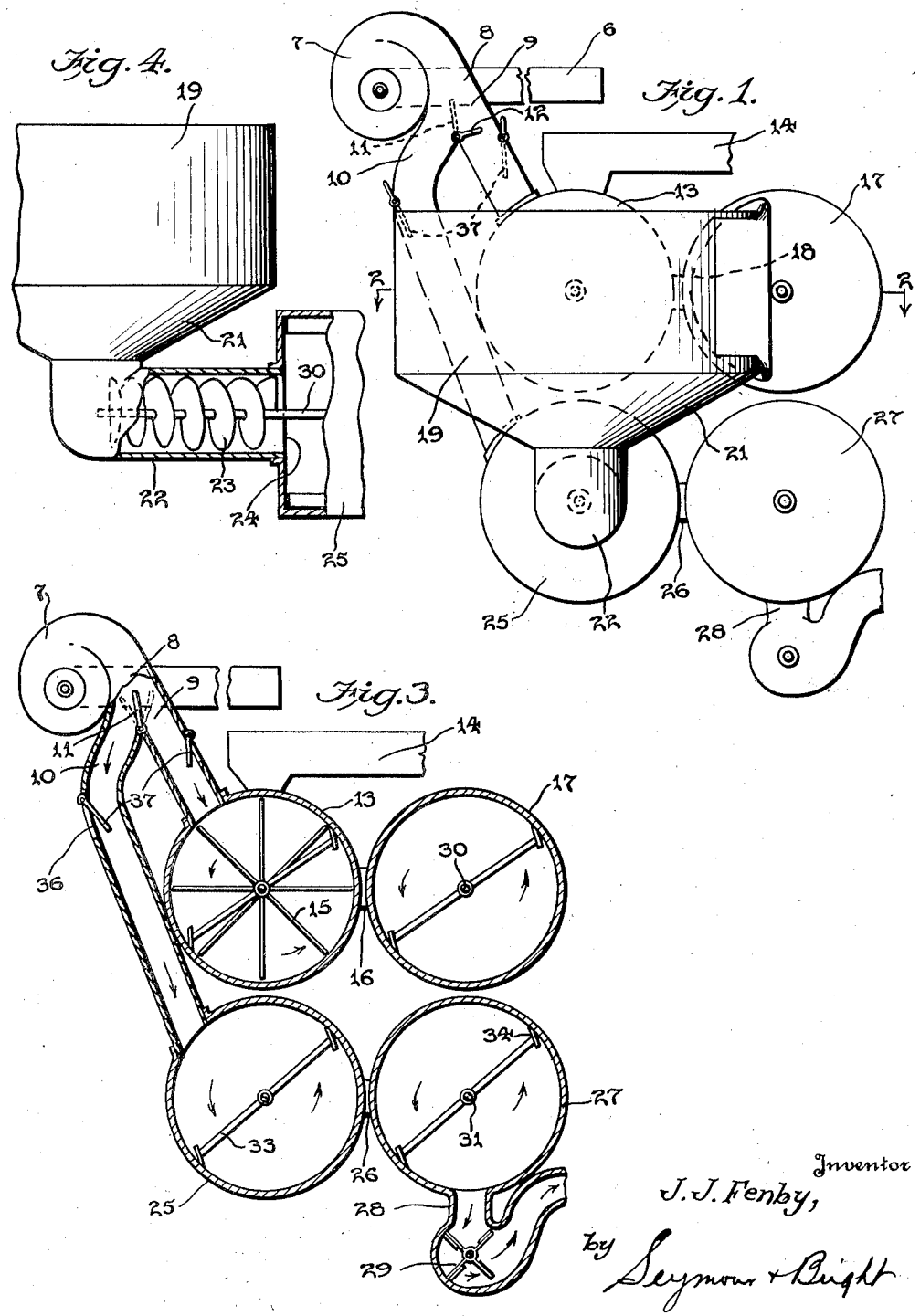

2,022,761

UNITED STATES PATENT OFFICE 2,022,761

DRYING METHOD AND APPARATUS

Jonathan J. Fenby, near Reisterstown, Md.

Application January 31, 1931, Serial No. 512,689

3 Claims. (Cl. 34—7)

This invention relates to improved method and apparatus for rapidly drying farm produce such as corn, hay, etc. It is customary for farmers after cutting growing corn, hay or the like, to permit such vegetation to remain in the fields for relatively long periods of time, and to rely on drying produced by the sun. This not alone prevents the immediate reuse of the fields for other crops, but a large proportion of the food value of the vegetation is lost. If growing corn, hay or the like is stored in a barn immediately after cutting, it not only has a tendency to rot but the moisture deposited will eventually destroy wood surfaces with which it comes in contact.

In accordance with my invention, the vegetation, immediately after it has been cut, is ground or finely chopped and then in its finely divided condition, is passed with a heated current or currents of air through a relatively long and narrow passageway, in which each particle is maintained in suspension and surrounded by the heated air. It requires about two and one-half minutes for the material to pass through the apparatus, so that it is speedily dried to the desired extent without loss of material or loss of food value, and without imparting a cooked taste to the product; and when the material is discharged from the apparatus, it can be stored in ordinary bins in a barn without the deposition of moisture, and will remain in perfect condition for use for long periods of time. I have found that stock prefer food prepared in this way to stock feed prepared in other ways.

By the use of the invention, harvest may be advanced five or six weeks, allowing two crops per year on the same ground, and the cost of drying is less than the cost of harvesting in the ordinary way.

The primary object of the invention is to provide a dryer for these purposes of simple and inexpensive construction which will occupy a relatively small space and which may be economically operated.

With the foregoing objects outlined and with other objects in view which will appear as the description proceeds, the invention consists in the novel features hereinafter described in detail, illustrated in the accompanying drawings and more particularly pointed out in the appended claims.

In the drawings,

Fig. 1 is an end view of my improved apparatus.

Fig. 2 is a horizontal sectional view partly in elevation, the section being taken on line 2—2 of Fig. 1.

Fig. 3 is a vertical sectional view on the line 3—3 of Fig. 2.

Fig. 4 is an elevation partly in vertical section of a detail.

Fig. 5 is a longitudinal sectional view of a portion of a modification.

Referring to the drawings, 6 designates an air intake tube in which air may be heated by any suitable means as it travels through the tube into a blower 7 which discharges into a force draft duct 8. This duct is provided with branches 9 and 10, and the volume of hot air flowing to either one of these branches may be controlled by a damper 11 which is pivotally mounted within the duct and is provided on the exterior of the duct with a handle 12.

Hot air discharging from the branch 9, enters one end of a stationary cylinder 13 where it is intimately admixed with the ground vegetation which is fed into the same end of the cylinder by means of a worm conveyor or the like, not shown, through a tube 14.

The passage of the ground vegetation and hot air through the cylinder will be assisted by a rotatable fan 15 arranged at the opposite end of the cylinder, and this fan will also assist in forcing the partially dried material and the hot air through a port 16 into a second similar cylinder 17 that is arranged alongside the cylinder 13. The material and hot air will travel longitudinally in the opposite direction through the cylinder 17 and will be discharged from that cylinder through an outlet pipe 18 which leads tangentially into a dust collector 19. In the member 19, all solids will be captured while the depleted or moist air will be discharged through an exit port 20.

The dust collector is of conventional construction and has the usual hopper bottom 21 down which the solids gravitate into a discharge tube 22 that is equipped with a worm conveyor 23. The conveyor feeds the material into the inlet port 24 which is arranged in one end of a lower cylinder 25. Hot air is forced into the inlet end of this cylinder through the branch 10, and this fresh or dry hot air travels with the material through the cylinder 25 until it is discharged at the opposite end of this cylinder through a conduit 26 into another lower cylinder 27. A fan, not shown, similar to the fan 15 may be arranged in the cylinder 25 to assist in forcing the hot air and material into the cylinder 27. Like in the upper cylinder 17, the mixture travels in a reverse direction until it reaches a discharge spout 28 which is positioned at the leading ends of the cylinders. This spout is equipped with a suction fan 29 which aids the other fans in the blower in keeping the air and materials in rapid motion while travelling through the apparatus, and the fan 29 also acts to force the air and material from the spout 28 to a suitable point of deposit or storage.

It will be noted that if the cylinders 13 and 17 are made of sufficient length, all of the drying may take place in these cylinders, and it will be unnecessary to pass the materials through the cylinders 25 and 27.

The various conduits and cylinders of the apparatus may be made of any suitable material such as metal, and the blower and fans may be of conventional construction. However, in order to maintain the chopped material in suspension while it travels through the cylinders, each cylinder is provided with a rotatable shaft 30. Mounted on these shafts are sleeves 31 which may turn on the shafts for adjustment purposes, but are normally rigidly fixed to the shafts by any suitable means such as set screws 32. Each sleeve is rigidly secured to the inner ends of a plurality of arms 33, and the outer ends of these arms are secured to bars or blades 34 which preferably have some flexibility lengthwise. Each bar preferably extends the full length of a cylinder and is positioned at an angle to a tangent of the circular wall of the cylinder. Consequently, when the shafts are rotated as indicated by arrows in Fig. 3, the chopped material will be scooped by the bars and will be thrown toward the axis of rotation with the result that the material will float through the cylinders in intimate contact with the hot air and this will result in extremely rapid drying of the material.

It will be recognized that if say the end arms 33 are adjusted by means of their sleeves 31 relatively to the intermediate arms of any cylinder, the flow of the material may be advanced or retarded.

Any suitable means may be employed to rotate the shafts 30. For example, each of these shafts may be provided at the rear end of the machine with a pulley 35 and all of these pulleys may be driven from a suitable prime mover by one or more belts.

The fan or fans 15 may be rigidly secured to the proper shafts, and I prefer to fixedly mount the conveyor 23 on one of these shafts.

For the purpose of regulating the temperature of the air discharging from the branches 9 and 10, each of these branches may have a cold air inlet 36, governed by a hand controlled damper 37.

Instead of making the stationary drums of true cylindrical shape, I may make them of the tapered shape shown at 38 in Fig. 5, and in such case, the inlets will be at the small end of the drum, as indicated at 39, and the outlet 40 will be at the large end.

The hot air from the blower need not be introduced into a cylinder at one end only, but as shown in Fig. 5, I may introduce the air into the cylinder at several points along the length thereof. For example, the air from the blower may enter a manifold pipe 50 having branches 39, 51 and 52 leading into the cylinder at various points along the length thereof, and within the manifold I will arrange pivoted dampers 53 and 54 for controlling the volume of hot air introduced into the cylinder at any one point.

It has been proposed heretofore in dryers having rotatable blades to so construct each blade as to scrape or cut the material from the inner surface of the cylinder, but such blades will not function to keep the material in suspension.

From the foregoing it is believed that the construction and operation of the apparatus, and the steps of the process, as well as the advantages of the invention may be readily understood, and I am aware that changes may be made in the details disclosed without departing from the spirit of the invention, as expressed in the claims.

What I claim and desire to secure by Letters Patent is:

1. A drying apparatus comprising first and second stationary cylinders, means for forcing hot air into one end of the first cylinder, means for introducing ground vegetable matter into the same end of the first cylinder, means at the opposite end of the first cylinder for transferring the material and hot air into one end of the second cylinder, means for discharging the material and air from the other end of the second cylinder, means for causing the air and material to travel through the first cylinder in one direction and through the second cylinder in the opposite direction, and rotatable means in each cylinder for scooping material passing therethrough and for throwing the material upwardly and away from the bottom portion of the wall of the cylinder for maintaining the material in suspension in the air as the admixture travels through the cylinder, the last mentioned means comprising a rotatable shaft, sleeves rotatably mounted on the shafts, arms fixed to the sleeves, longitudinally flexible bars connected to the outer ends of the arms, and means for adjustably securing the sleeves to the shafts.

2. A drying apparatus including a substantially horizontal hollow cylinder having outlet means at one end portion thereof, means at the other end portion of the cylinder for introducing moist particles of vegetable material into the cylinder, means at the same end portion of the cylinder for introducing a stream of hot air into the cylinder for conveying the material through the cylinder and for discharging the same through said outlet means, and movable diffusing means for constantly throwing the material toward the center of the cylinder and into the air stream while simultaneously directing the material away from the cylinder wall, whereby the particles in being propelled through the cylinder by the air stream are maintained in a floating condition in the air stream, said last mentioned means functioning to keep the material in suspension without conveying the material through the cylinder.

3. A drying apparatus including a substantially horizontal hollow cylinder having outlet means at one end portion thereof, means at the other end portion of the cylinder for introducing moist particles of vegetable material into the cylinder, means at the same end portion of the cylinder for introducing a stream of hot air into the cylinder for conveying the material through the cylinder and for discharging the same through said outlet means, and movable diffusing means for constantly throwing the material toward the center of the cylinder and into the air stream while simultaneously directing the material away from the cylinder wall, whereby the particles in being propelled through the cylinder by the air stream are maintained in a floating condition in the air stream, said last mentioned means functioning to keep the material in suspension without conveying the material through the cylinder and comprising blades rotatable about the axis of the cylinder and positioned adjacent to the inner surface of the cylinder, each blade being arranged at an angle to a tangent of the cylinder.

JONATHAN J. FENBY.